(12) United States Patent
Schuler

(10) Patent No.: US 8,807,608 B2
(45) Date of Patent: Aug. 19, 2014

(54) LIFTING TRUCK WITH LOCKING DEVICE FOR A BATTERY BLOCK

(75) Inventor: Michael Schuler, Schonberg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 1392 days.

(21) Appl. No.: 11/947,538

(22) Filed: Nov. 29, 2007

(65) Prior Publication Data

US 2008/0135704 A1 Jun. 12, 2008

(30) Foreign Application Priority Data

Dec. 6, 2006 (DE) .......................... 10 2006 057 490

(51) Int. Cl.
*B65D 45/00* (2006.01)
*B60R 16/04* (2006.01)

(52) U.S. Cl.
USPC ........ 292/256; 292/336.3; 292/257; 180/68.5

(58) Field of Classification Search
USPC .................... 292/256, 194, 200, 256.69, 257, 292/DIG. 49, DIG. 57, DIG. 38, DIG. 56, 292/196, 336.3, DIG. 30; 248/154, 222.13, 248/226.11, 229.11, 229.13, 229.15, 229.2, 248/229.21, 229.23, 231.31, 231.51, 231.9, 248/316.1–316.3, 646, 674; 180/68.5, 65.1, 180/907; 312/222; 429/96, 97, 99
See application file for complete search history.

(56) References Cited

U.S. PATENT DOCUMENTS

| | | | | | |
|---|---|---|---|---|---|
| 1,939,742 | A | * | 12/1933 | Wanemaker | 180/68.5 |
| 2,588,870 | A | * | 3/1952 | Pittman | 180/68.5 |
| 3,542,324 | A | * | 11/1970 | Willinger | 248/689 |
| 4,756,564 | A | * | 7/1988 | Ikeda | 292/216 |
| 4,896,908 | A | * | 1/1990 | Kleefeldt | 292/216 |
| 5,186,333 | A | * | 2/1993 | Pierson et al. | 209/370 |
| 5,632,517 | A | * | 5/1997 | Paulik et al. | 292/341.12 |
| 5,785,366 | A | * | 7/1998 | Takaishi et al. | 292/341.12 |
| 6,203,076 | B1 | * | 3/2001 | Wytcherley et al. | 292/202 |
| 6,554,329 | B1 | * | 4/2003 | DeBlock et al. | 292/216 |
| 6,565,135 | B2 | * | 5/2003 | Wytcherley et al. | 292/336.3 |
| 7,389,615 | B1 | * | 6/2008 | Kelley | 52/202 |
| 7,397,674 | B2 | * | 7/2008 | Schlack | 361/801 |

FOREIGN PATENT DOCUMENTS

DE 102004047339 A1 * 3/2006
EP 126855 A1 * 12/1984

OTHER PUBLICATIONS

Computer-Generated Translation of DE 102004047339 A1.*

* cited by examiner

*Primary Examiner* — Carlos Lugo
*Assistant Examiner* — Alyson M Merlino
(74) *Attorney, Agent, or Firm* — Vidas, Arrett & Steinkraus

(57) ABSTRACT

A lifting truck, in the frame of which a battery mount is arranged, wherein a locking device is provided, which locks in a releasable manner the battery block in the installed state with respect to the frame or a battery mount, wherein the locking device has a first lever and a second lever. The second lever works with at least one buffer on an inside wall of the battery block to clamp it against a stop.

9 Claims, 5 Drawing Sheets

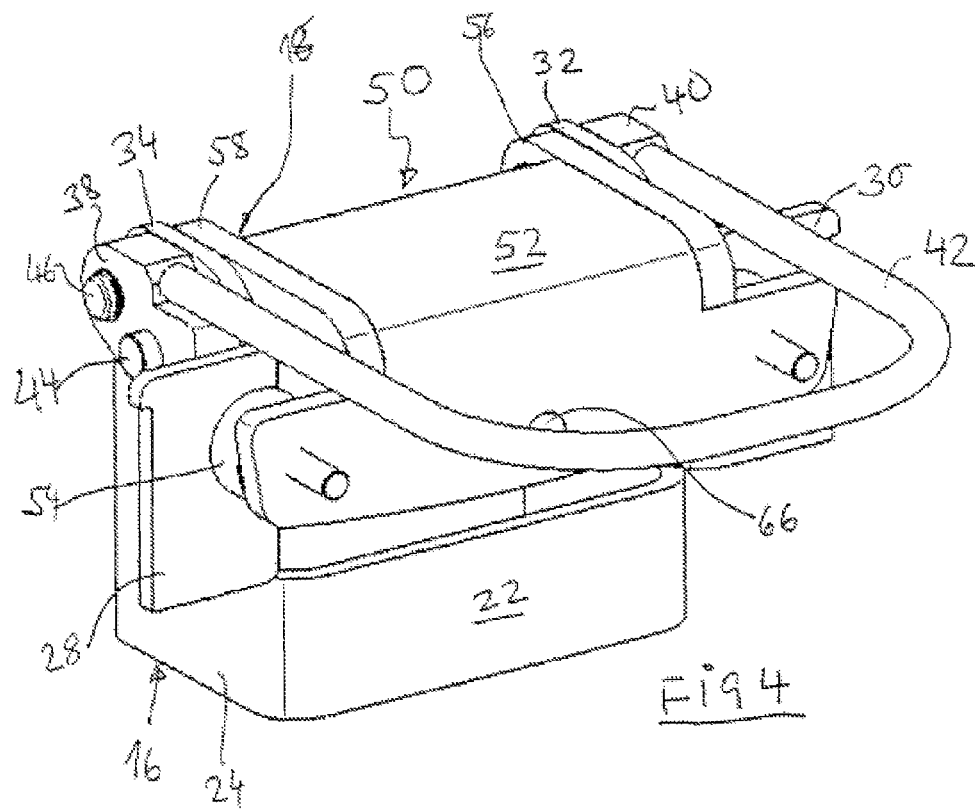
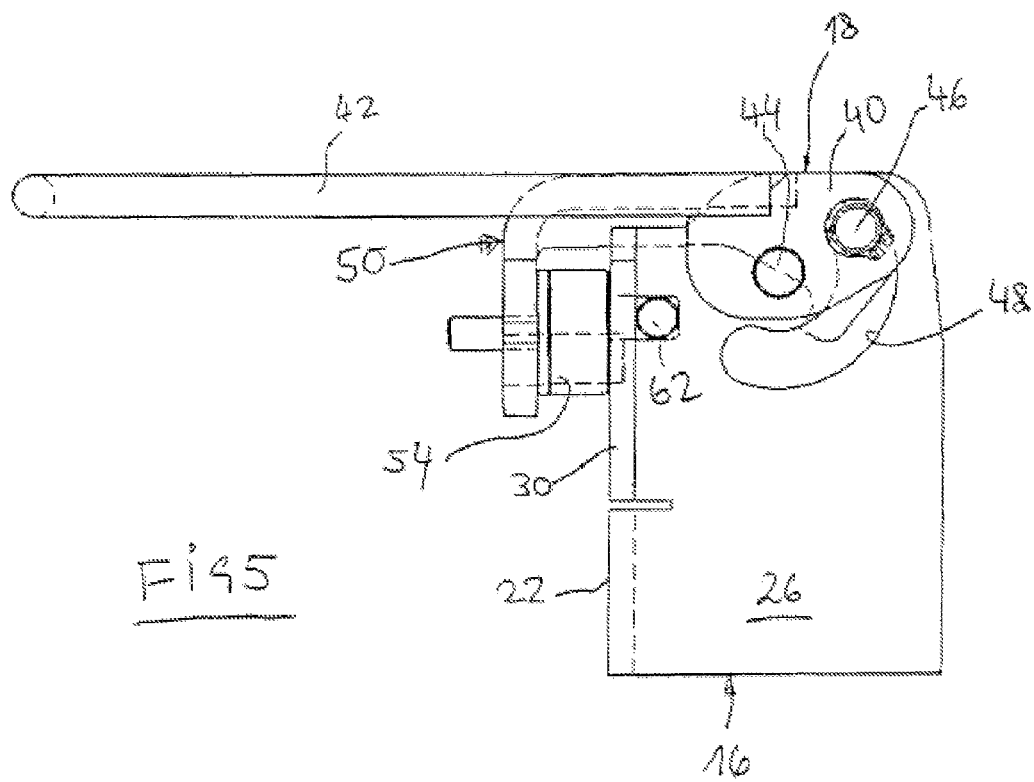

LIFTING TRUCK WITH LOCKING DEVICE FOR A BATTERY BLOCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

This type of lifting truck became known for example from DE 10 2004 047 339 A1, the entire contents of which is incorporated herein by reference, the levers of the locking device form a toggle lever lock, wherein a first lever is swivel-mounted on the frame of the vehicle around a horizontal axis. The second lever is swivel-mounted on the first lever and has a hook section, which in the locked position engages behind a bolt on the inner side wall of the battery block. In the unlocked position, the battery block can be moved out horizontally to one side. For full release, the first lever must be pivoted into a first unlocked position and then into a second unlocked position.

The object of the invention is to create a ground conveyor with a locking device for a battery block, in which a fast and simple battery replacement is possible with ergonomic operation and without the use of tools. The locking device according to the invention should enable use of unmodified standard batteries.

BRIEF SUMMARY OF THE INVENTION

In the case of the invention, a first lever is swivel-mounted on the frame of a vehicle and a second lever is coupled with the first lever and carries at least one buffer. The construction is such that when the first lever is actuated the buffer can be engaged with or disengaged from a wall of the battery block, preferably the inside of the front wall, in order to press the associated wall or the battery block in a clamping manner against the frame-proof stop. The first and/or second lever can be held in a releasable manner in the locked position through suitable means. The levers can form a toggle lever lock, in order to either clamp or release the buffer against the battery block.

In one embodiment of the invention, a side wall that holds a bracket component on the upper end can be attached to the battery mount. The bracket component is preferably a component, which is welded for example on the side wall. The side wall can be attached to one of both free end sides of the battery mount, depending on the push-out direction for the battery block.

The bracket component has a stop surface against which the associated front wall of the battery block rests. The first lever of the locking device is swivel-mounted on the bracket component, and the second lever is mounted on the first lever such that the locking portion in the locked position clamps onto the upper part of the front wall from the inside. In the released position, the locking portion is pivoted far enough upwards that the battery block can at least be moved horizontally away from the side wall.

Due to the fact that the locking portion receives the inner side wall of the battery block, which already projects slightly over the top side of the battery, the battery block does not need to be designed in a special manner with respect to the lock. Thus, unmodified standard batteries can be used. The battery can be removed on both sides, whereby the side wall is installed on the corresponding side of the battery mount. Thus, the battery lock is not located directly on the vehicle frame, but rather on the already mentioned side wall. The first lever only needs to be pivoted in one direction in order to bring the second lever into the locked or unlocked position. Actuation is thus ergonomic and quick.

It is provided according to one embodiment of the invention that the locking portion has at least one buffer made of an elastomer material. In the locked position, the buffer connects to the inside of the front wall and holds the front wall of the battery block against the stop surface in the bracket component. The buffer is pressurized so that the toggle lever lock is pre-stressed in this manner.

In accordance with another embodiment of the invention, a bracket pin is provided for mounting the second lever on the first a curved slit in the bracket component, in which the bracket pin in guided. In accordance with another embodiment of the invention, the bracket component can have a boundary portion, against which a stop portion of the second lever engages when the second lever is pivoted into the released position. In accordance with another embodiment of the invention, the boundary portion can have a hook and the contact portion can have a contact pin for this purpose. This prevents the over-pivoting of the first lever during the movement into the released position.

In accordance with another embodiment of the invention, a guide portion is provided on the bracket component and works together in the pivot area near the released position with a guide surface of the second lever in order to pivot the locking portion freely over the upper edge of the front wall. With the help of this type of arrangement, the second lever can be pivoted far enough upwards that the battery block can easily be moved out of the battery mount.

In the case of a constructive embodiment of the invention according to another embodiment of the invention, the second lever has an angular jaw portion, to which the locking portion, e.g. the buffer, is attached. Two parallely spaced lifting arms can be swivel mounted with two parallely spaced lifting arms of the first lever.

A vertical leg of the jaw portion preferably has two laterally spaced buffers, each of which face a contact surface of the bracket component.

In order to prevent the jaw portion from slipping up and thus releasing the lock, a vertical part of the jaw portion can—according to another embodiment of the invention—have a boundary pin near the center, which points in the direction of the front wall in the locked position and which engages with a transport opening of the front wall. These types of transport openings exist in standard battery blocks in order to be able to lift and move them using a lifting device.

BRIEF DESCRIPTION OF SEVERAL VIEWS OF THE DRAWINGS

One exemplary embodiment of the invention is explained below in greater detail using drawings.

FIG. 4 shows a perspective view of the bracket component with the locking device according to the invention.

FIG. 5 shows the side view of the arrangement according to FIG. 4.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
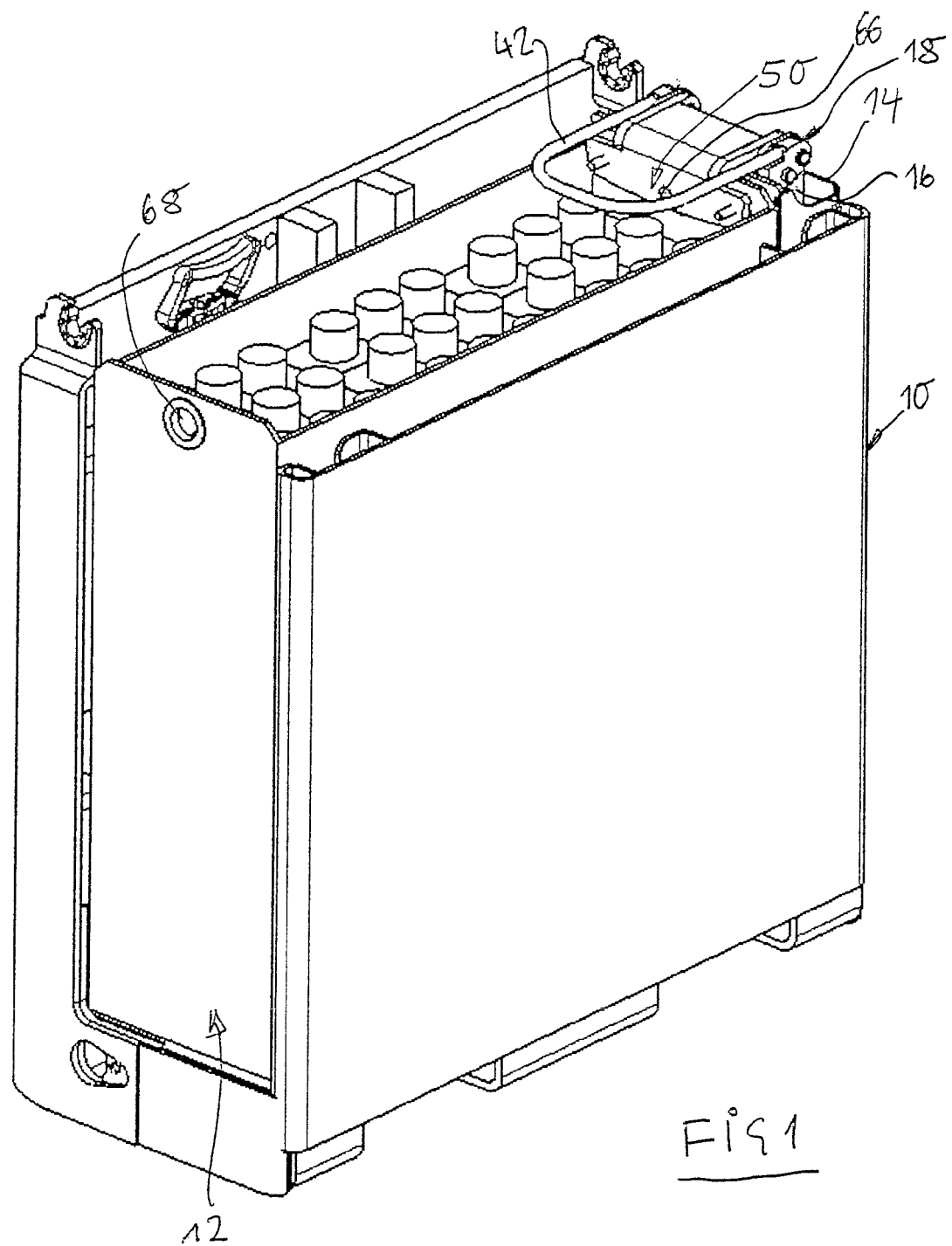
FIG. 1 shows a perspective view of a battery mount with a battery block and a locking device according to the invention in the locked position.
Figure 2:
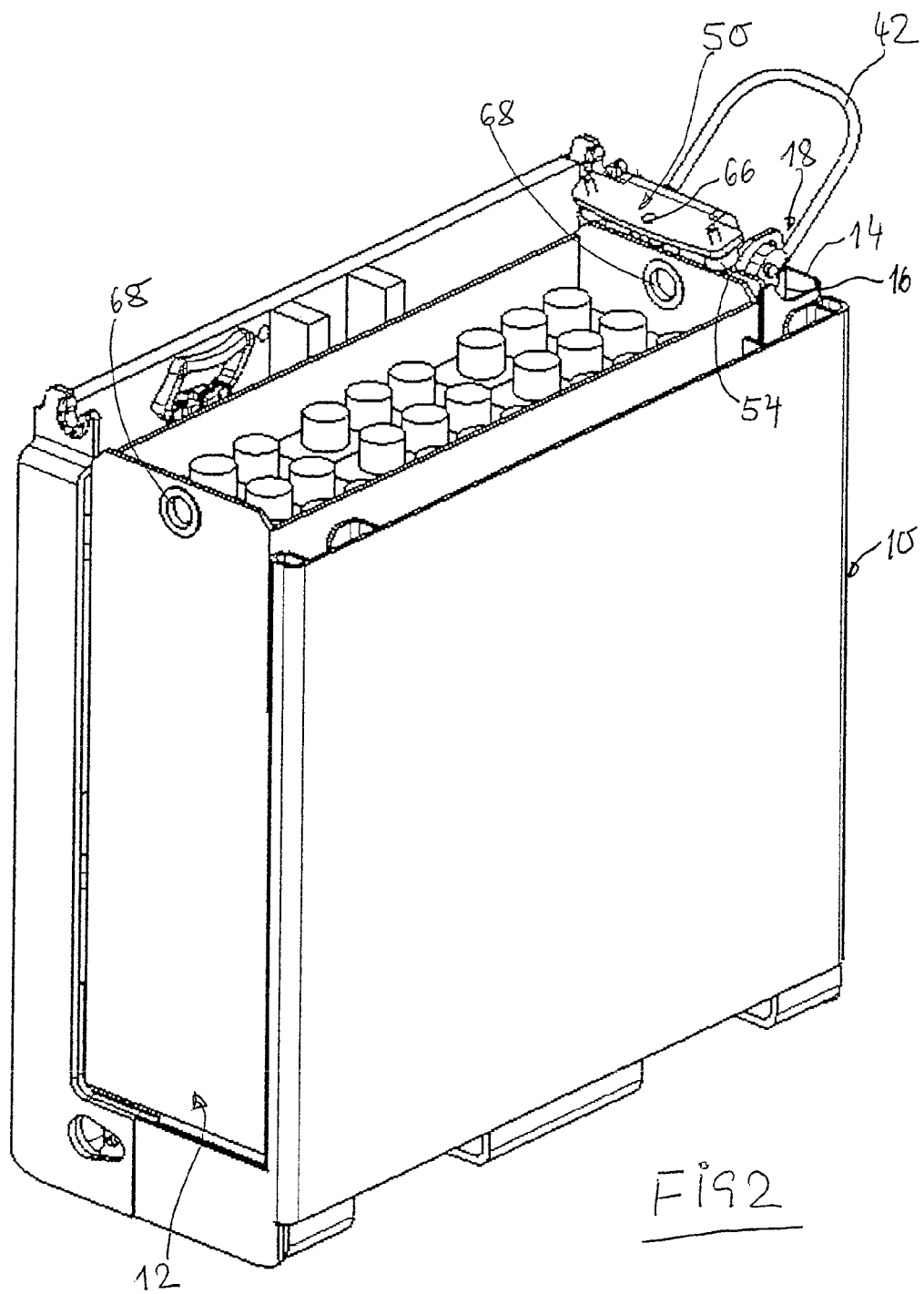
FIG. 2 shows the same view as FIG. 1 with the locking device in the unlocked position.

FIGS. 1 and 2 show a battery mount 10, which is arranged in the frame of a lifting truck that is not shown in greater detail. The battery mount 10 receives a battery block 12, which has front walls and side walls. As can be seen, the battery block 12 can be moved to the left side of the battery mount 10 in FIGS. 1 and 2. The other front side of the battery mount 10 is closed by a side wall 14, which is screwed for example onto the battery mount. Alternatively, the side wall 14 can also be screwed on the open side of the battery mount 10 in FIGS. 1 and 2.

Figure 3:
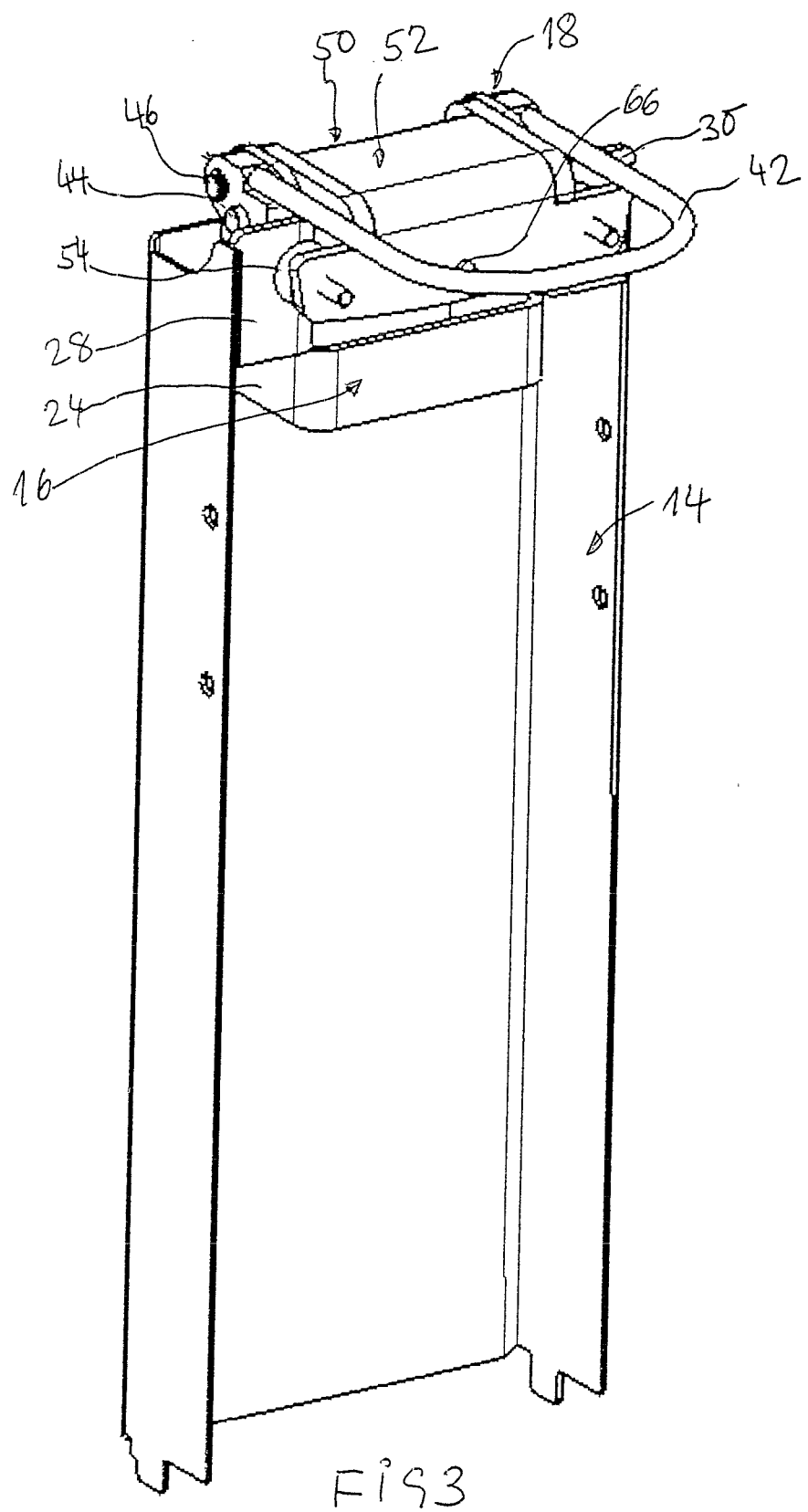
FIG. 3 shows a perspective view of a side wall with a bracket component for a locking device according to the invention.

On the upper end, the side wall 14 carries a bracket component 16 (FIG. 3) for a locking device 18, which will be described in greater detail below in connection with FIGS. 4 through 7. As can be seen in FIG. 3, the side wall 14 has a U-shaped cross-section. The bracket component 16 is attached between the legs of the U profile and the inside of the bar section, for example through welding. However, this is not illustrated in detail.

The bracket component, as can be seen in FIGS. 4 through 7, has a front wall 22, which is lower than side walls 24, 26, which form stop portions 28, 30, which are bent to the side. Bracket portions 38, 40 of a first clamp-like lever 42 are coupled with inwardly bent sections 32, 34 of the side walls 24, 26 and namely with the help of a bracket pin 44. The lever 42 can be pivoted around a horizontal axis on bracket component 16 with the help of the bracket pin 44. A bracket bolt 46, which engages with a curved slit 48 of the bracket sections 38, 40 and is coupled with the first lever 42 via a second lever 50, is also located in section 38. The slit 48 forms end stops for the lever actuation. The second lever 50 has an angular jaw portion 52 with a horizontal and vertical section in the position in FIG. 3. The vertical section is elongated towards both sides in an ear-like manner and rubber buffers 54 sit on these elongations. As can be seen in FIGS. 4 and 5, the rubber buffets 54 work together with the stop portions 28, 30 of the bracket component 16. Lever arms 56, 58, which work together with the bracket bolts 46, are provided on both sides of the horizontal section of the jaw portion 52.

Figure 7:
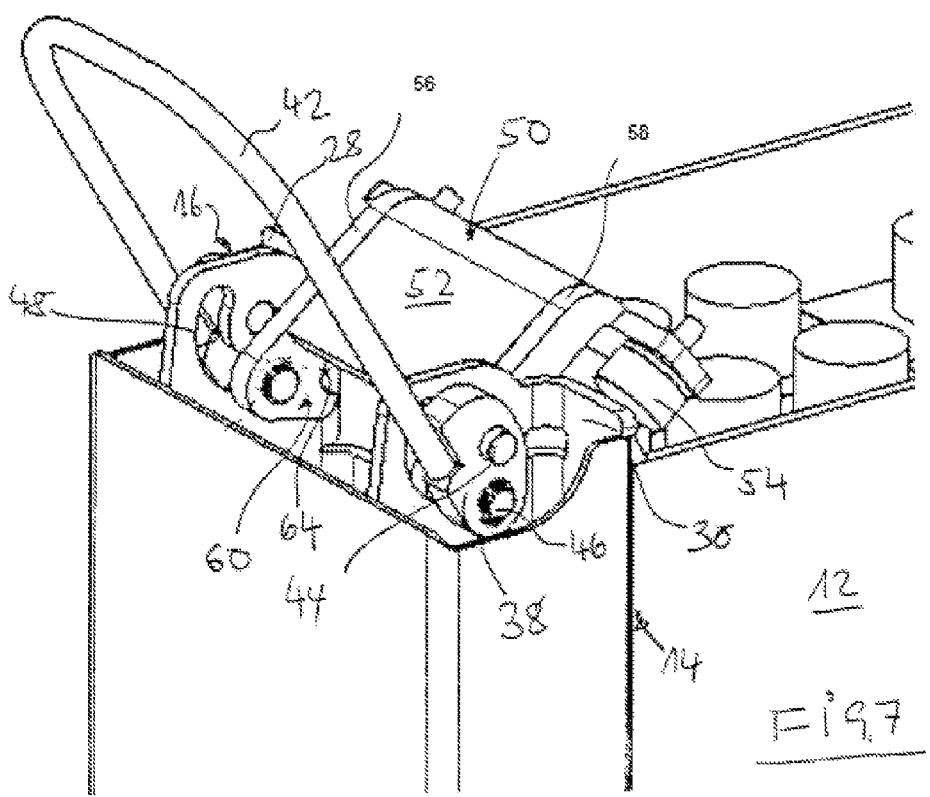
FIG. 7 shows the representation according to FIG. 6 in the unlocked position.

As can be seen with 60 in FIG. 7, the lever arms 56, 58 have on the inner section hook sections, which work together with a stop pin. The lever arms 56, 58 also have a ramp surface 64, which works together with the pin for the purpose of guiding the second lever 50.

The first and second lever 42, 50 work together like a toggle lever lock. In a locked position, as shown in FIGS. 4 and 5, the height of the axes of the bracket pins 44, 46 are offset with respect to each other. Since the buffers 54 work against the sections 28, 30, they create a pre-stressing when dead center is exceeded, when the lever 42 is pivoted from a raised position to the horizontal locked position shown in FIGS. 4 and 5.

Figure 6:
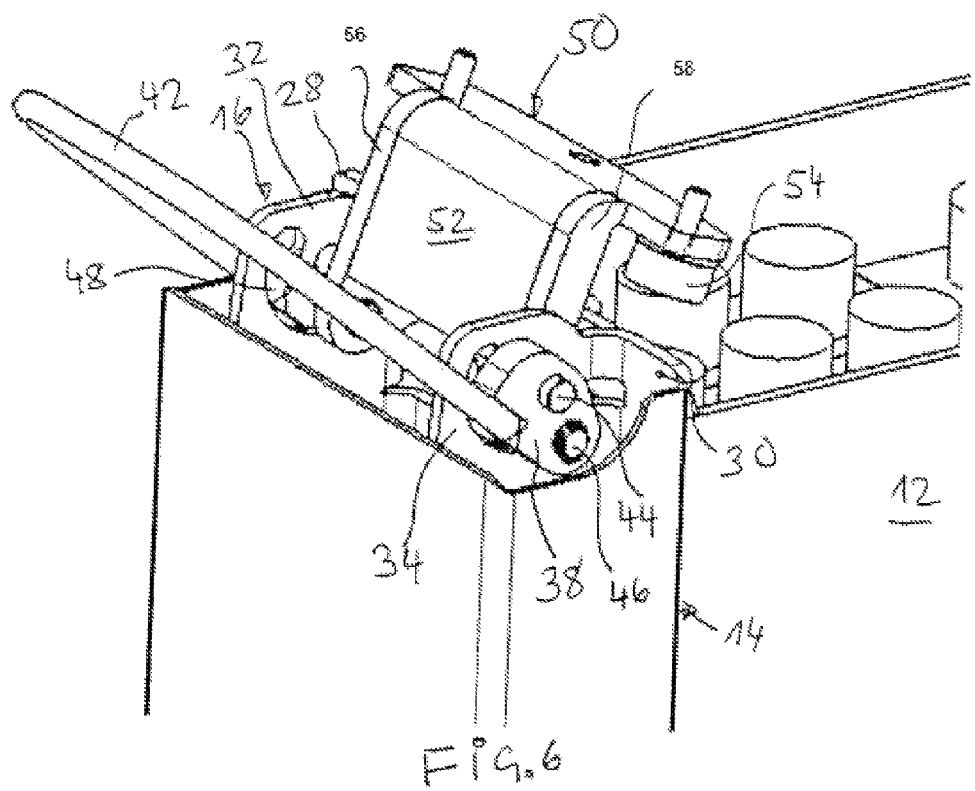
FIG. 6 shows the locking device according to FIGS. 4 and 5 near the unlocked position.

In the locked position in accordance with FIGS. 4 and 5 or 1, the buffers 54 grip from the inside against a front wall of the battery block 12 (not shown). The battery block 12 is indicated in FIGS. 6 and 7. As is generally known, wall sections of the battery block 12 project upwards over the received battery. The buffers 54 thus engage with the top of the inside of the front wall in order to hold and lock the battery block 12 in this position against the stop portions 28, 30 in accordance with FIGS. 4 and 5. In the locked position, a pin 66 on the inside of the vertical jaw section 52 also engages with a hole 68 (see FIGS. 1 and 2), which is formed on the upper edge of the front walls of the battery block 12 for shipping purposes. The pin 66 is not in contact with the battery; rather it should just prevent the lever 50 from slipping up and thus the release of the lock.

If the lever 42 is pivoted into the open position, the second lever 50 also pivots, and the buffers 54 pivot over the edge of the battery block 12 as shown in FIGS. 6 and 7. FIG. 6 shows a 120° pivoting of the lever 42 with respect to the locked position in accordance with FIGS. 4 and 5, while FIG. 7 shows a 140° pivoting. In this final unlocked position, the hook section 60 lies on the stop pin 62 (FIG. 5) such that further opening is not possible. However, the pivot position of the second lever 50 is such that the battery can not only be moved out laterally, but also upwards. The buffers 54 are thus no longer in the way.

So that the second lever 50 can perform the described pivoting into the unlocked position, the ramp section 64 of the lever aims 56, 58 works together in the desired manner with the stop pin 62, which forms a guide here.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A ground conveyor, in the frame of which a battery mount is arranged, into which a battery block can be moved in or out, the battery block having front walls and side walls, the front walls each having an inner upper wall surface, wherein a locking device with two cooperative levers is provided, which locks in a releasable manner the battery block in an installed state with respect to the frame or the battery mount, wherein the two cooperative levers comprise a first lever, which is mounted on a vehicle axis and a second lever, which is swivel-mounted on the first lever and is designed such that it clamps onto the inner upper wall surface of one of the front walls of the battery block with the help of at least one buffer, and further wherein the at least one buffer presses one of the front walls of the battery block against the battery mount, wherein further the first and second levers form a toggle lever lock, in which the first lever is pivoted over the dead center of the toggle lever lock, when the second lever is in a locked position, further wherein a side wall can be attached on one end of the battery mount, which holds on an upper end, a bracket component, on which the first lever is swivel mounted, the bracket component has at least one stop surface, the second lever is coupled to the bracket component such that the second lever is guided to cause the at least one buffer to clamp onto the inner wall surface of one of the front walls of the battery block in the locked position and is pivoted to a released position so far upwards that the battery block can be moved at least horizontally away from the side wall attached on one end of the battery mount.

2. The ground conveyor according to claim 1, wherein the at least one buffer is made of an elastomer material.

3. The ground conveyor according to claim 1, wherein a bracket pin for mounting the second lever engages with a curved slit of the bracket component.

4. The ground conveyor according to claim 1, wherein the bracket component has a boundary portion, against which a stop portion of the second lever engages when the second lever is set to the released position.

5. The ground conveyor according to claim 4, wherein the boundary portion is a hook section and the stop portion is a stop or boundary pin.

6. The ground conveyor according to claim 1, wherein a guide portion is provided on the bracket component, which in a pivot area of the second lever near the released position, works together with a guide surface of the second lever in order to pivot a locking portion freely over an upper edge of the front wall of the battery block.

7. The ground conveyor according to claim 1, wherein the second lever has an angular jaw portion, on which a locking portion is attached and which has two parallel spaced lever arms, which are coupled in parallel with parallel spaced lever arms of the first lever.

8. The ground conveyor according to claim 1, wherein the at least one buffer comprises two laterally spaced buffers which are attached to vertical legs of a jaw portion, each of which work together with the at least one stop surface of the bracket component.

9. The ground conveyor according to claim 7, wherein within a vertical part of the jaw portion is arranged almost in the center, a boundary pin extending in the direction of a stop surface, which engages with a transport opening of one of the front walls of the battery block when the second lever is in the locked position.

* * * * *